United States Patent [19]

Koide et al.

[11] Patent Number: 4,623,192

[45] Date of Patent: Nov. 18, 1986

[54] SEAT

[75] Inventors: Teruhiko Koide; Teruhiko Kawaguchi; Hideyuki Suzuki; Tsutomu Muraoka, all of Aichi, Japan

[73] Assignee: Kabushiki Kaisha Tokai-Rika-Denki-Seisakusho, Aichi, Japan

[21] Appl. No.: 843,252

[22] Filed: Mar. 24, 1986

[30] Foreign Application Priority Data

Mar. 26, 1985 [JP] Japan ............................ 60-43337[U]

[51] Int. Cl.$^4$ ............................................ B60R 21/00
[52] U.S. Cl. .................................... 297/216; 297/284; 297/464
[58] Field of Search .............. 297/216, 284, 458, 312, 297/464

[56] References Cited

U.S. PATENT DOCUMENTS

| 3,452,834 | 7/1969 | Gaut | 297/216 X |
| 4,154,472 | 5/1979 | Bryll | 297/216 X |
| 4,183,582 | 1/1980 | Taki | 297/464 |
| 4,257,626 | 3/1981 | Adomeit | 297/216 X |
| 4,334,709 | 1/1982 | Akiyama et al. | 297/284 |

FOREIGN PATENT DOCUMENTS 2456028  8/1976  Fed. Rep. of Germany ...... 297/216

Primary Examiner—James T. McCall
Attorney, Agent, or Firm—Sixbey, Friedman, & Leedom

[57] ABSTRACT

A seat which is employed in combination with a seatbelt system for a vehicle designed to protect an occupant when an emergency situation of the vehicle occurs. When the tension acting on the seatbelt exceeds a predetermined value, a movable member connected to a seatbelt anchor member causes a push-up member to move upwards within a seat cushion. As a result, the push-up member forms a protuberance at the front part of the seat cushion, whereby the movement of the occupant's waist toward the front end of the vehicle is limited.

19 Claims, 5 Drawing Figures

SEAT

BACKGROUND OF THE INVENTION

1. Field of the Invention

The present invention relates to a seat and, more particularly, to a structure for pushing up a seat cushion employed in a seat for seating an occupant of a vehicle so that a part of the seat cushion is pushed up in response to the operation of a seatbelt system designed to protect the occupant in emergency situation of the vehicle, thereby allowing the occupant's body to be restrained more reliably.

2. Description of the Related Art

Seatbelt systems for vehicles are generally arranged such that an occupant fastens a webbing and, when an emergency situation of the vehicle occurs, the occupant's body is restrained by this webbing.

At the time of an emergency situation of the vehicle, it is preferable to restrain the upper part and waist of the body of an occupant so that his body is prevented from moving toward the front end of the vehicle by a substantial extent.

In a three-point type seatbelt system, the upper part of the body of an occupant is restrained by a shoulder webbing, and there is therefore no risk of the occupant's body moving forwardly to a substantial degree. The waist of the occupant is restrained by a lap webbing and, in order to prevent his waist from moving forwardly to a substantial extent when an emergency situation of the vehicle occurs, the anchor point of the lap webbing needs to be disposed as close to the rear end of the vehicle as possible. In the case where an anchor member is provided on the seat, however, the place where the anchor point can be disposed is limited.

SUMMARY OF THE INVENTION

In view of the above-described circumstances, it is a primary object of the present invention to provide a seat which enables the waist of an occupant to be restrained in a satisfactory condition even when the anchor member of the webbing is provided on the seat.

To this end, the present invention provides a seat comprising: a push-up member buried in the front portion of a seat cushion; a movable member provided in the seat cushion such as to be movable toward the front end of the seat cushion, the movable member being adapted to push up the push-up member toward the upper side of the cushion when the movable member moves toward the front end of the cushion; and a seatbelt anchor member secured at a part thereof to the movable member.

According to the present invention, therefore, the movable member is moved toward the front end of the vehicle by the load which is applied to the anchor member by the inertia acting on the occupant's body when an emergency situation of the vehicle occurs, and the push-up member is pushed up by this movement of the movable member, thereby virtually increasing the height of the front portion of the seat cushion. In consequence, the movement of the occupant's waist toward the front end of the vehicle is limited, and his waist is reliably restrained in a satisfactory condition.

DESCRIPTION OF THE PREFERRED EMBODIMENTS

The present invention will be described hereinunder in detail by way of preferred embodiments and with reference to the accompanying drawings.

Figure 1:
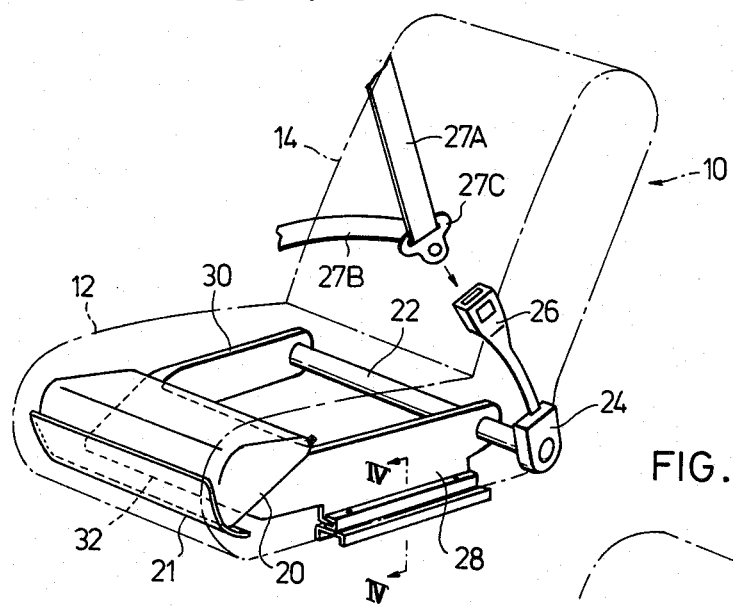
FIG. 1 is a perspective view of a first embodiment of a seat according to the present invention which has a seat cushion pushing-up structure.
Figure 2:
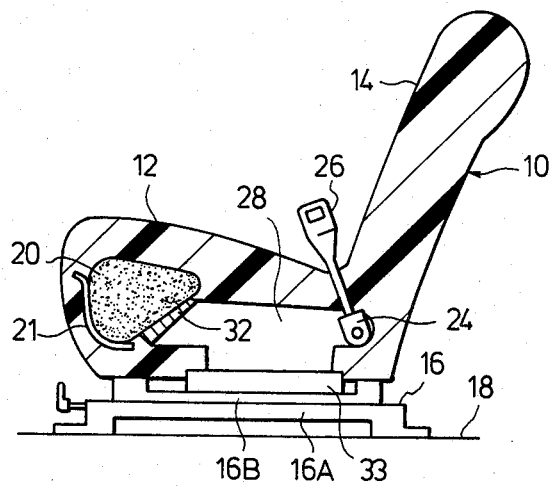
FIG. 2 is a sectional side view of the seat shown in FIG. 2.

FIGS. 1 and 2 show in combination a seat 10 in accordance with a first embodiment of the present invention. The seat 10 includes a seat cushion 12 and a backrest 14. The lower end portion of the backrest 14 is secured to the rear end portion of the seat cushion 12. The seat cushion 12 is supported on a floor member 12 of a vehicle through a seat slide means 16 so that the seat 10 is movable in the longitudinal direction of the vehicle. The seat slide means 16 includes a lower rail 16A secured to the floor member 18, and an upper rail 16B which is fitted into the lower rail 16A in such a manner that the upper rail 16B is slidable in the longitudinal direction of the vehicle. The upper rail 16B is secured to a frame (not shown) of the seat cushion 12. The seat slide means 16 is further provided with an ordinary lock mechanism for fixing the upper rail 16B at any desired position in the longitudinal direction of the vehicle. The backrest 14 may, of course, be mounted to the seat cushion 12 so that the backrest 14 is pivotal, i.e., reclinable.

The seat 10 is constituted by a cushioning material and a skin which are mounted around a frame (not shown). In this point, the seat 10 is similar to the conventional seats.

A cushion member 20 which serves as a push-up member is buried in the front part of the seat cushion 12. This cushion member 20 may be made of a material similar to that for cushion members buried in other portions of the seat 10. It is, however, preferable to employ a material which has a relatively high compressive resistance and which is able to absorb energy by means of compression, e.g., expanded polystyrene, expanded styrol, etc.

A guide panel 21 having a substantially U-shaped cross-section is disposed at the front end of the cushion member 20. This guide panel 21 serves to guide the cushion member 20 upwardly.

In addition, a support shaft 22 extends through the seat cushion 12 in the lateral direction of the vehicle and at a position near the joint between the seat cushion 12 an the backrest 14. One end of the support shaft 22 projects from the seat cushion 12, and an anchor plate 24 is secured to this projecting end. A buckle device 26 projects upwardly from the anchor plate 24 so that a tongue plate 27C which is connected to the respective distal ends of a shoulder webbing 27A and a lap webbing 27B is engageable with the buckle device 26. Thus, the anchor plate 24 and the buckle device 26 constitute in combination an anchor member of the seatbelt system.

Movable members or plates 28 and 30 are disposed within the seat cushion 12, and the respective rear end portions of the plates 28 and 30 are pivotally supported at two end portions of the support shaft 22. The movable plates 28 and 30 extend in the longitudinal direction of the vehicle, and the respective front end portions thereof are connected by a lateral plate 32.

Figure 4:
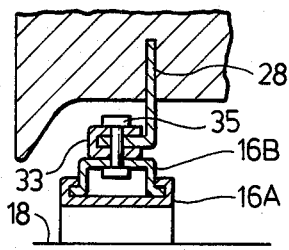
FIG. 4 is a sectional view taken along the line IV—IV in FIG. 1.

Each of the movable plates 28 and 30 is arranged as follows. As shown in FIG. 4, the lower end portion of each of the movable plates 28 and 30 is bent at right angles, and the distal end portion of this bent lower end of the plate is inserted into a groove defined in a guide rail 33 which has a U-shaped cross-section and which is secured to the upper rail 16B. Each of the movable plates 28 and 30 is slidable in the longitudinal direction of the vehicle while being guided by the guide rail 33. However, since shear pins 35 extend through the guide rail 33, the movable plate 28 (30) and the upper rail 16B so as to secure them together, the movable plates 28 and 30 are not allowed to move unless a particularly large force acts on the plates 28 and 30 through the buckle device 26 and the shear pins 35 are thereby sheared.

In place of the shear pins 35, it is possible to employ, for example, plate materials which are deformed when a load larger than a predetermined value is applied thereto.

The lateral plate 32 is slanted in such a manner that the upper side thereof obliquely faces the the front end of the vehicle. In correspondence to the lateral plate 32, the rear end face of the cushion member 20 also has a slanted surface which obliquely faces the rear end of the vehicle, and the cushion member 20 abuts against the lateral plate 32 at this slanted surface. Accordingly, the cushion member 20 can serve as a stopper which prevents any undesirable movement of the movable plates 28 and 30 toward the front end of the vehicle.

The following is a description of the operation of the above-described embodiment.

After seating himself in the seat 10, the occupant engages the tongue plate 27C with the buckle device 26, and he is thereby brought into a seatbelt fastened condition. The tongue plate 27C is connected to the distal ends of the shoulder webbing 27A and the lap webbing 27B; therefore, the occupant is in a three-point webbing fastened state. Since the buckle device 24 is movable together with the seat 10 when the position of the seat 10 is adjusted by moving it in the longitudinal direction of the vehicle, the occupant can be maintained in the same webbing fastened condition at any time of this adjustment.

When the vehicle runs into an emergency situation, the inertia acts on the occupant's body so as to move toward the front end of the vehicle. However, his body is restrained by the webbings 27A and 27B and thereby prevented from moving forwardly. The upper part of the occupant's body is mainly restrained by the shoulder webbing 27A, and his waist by the lap webbing 27B.

Figure 3:
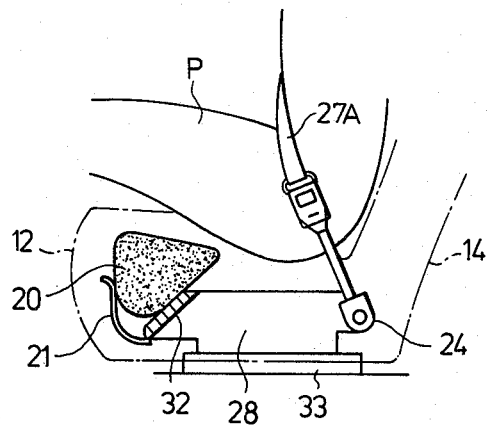
FIG. 3 shows the operation of the seat shown in FIG. 2.

When the load which acts on the buckle device 26 through the webbings 27A and 27B exceeds a predetermined value, the shear pins 35 are ruptured. In consequence, the movable plates 28 and 30 are moved toward the front end of the vehicle while being guided by the guide plates 33. As a result, the lateral plate 32 presses the cushion member 20 toward the front end of the vehicle so that the member 20 is compressed between the plate 32 and the guide panel 21, thereby absorbing the energy. In addition, the lateral plate 32 pushes up the cushion member 20 toward the upper side of the seat cushion 12 along the guide panel 21. Consequently, the front portion of the seat cushion 12 is virtually raised, whereby the movement of the waist of the occupant P toward the front end of the vehicle is limited as shown in FIG. 3, and the occupant's waist is prevented from sinking, thus enabling the occupant's body to be reliably restrained in a safe condition.

Figure 5:
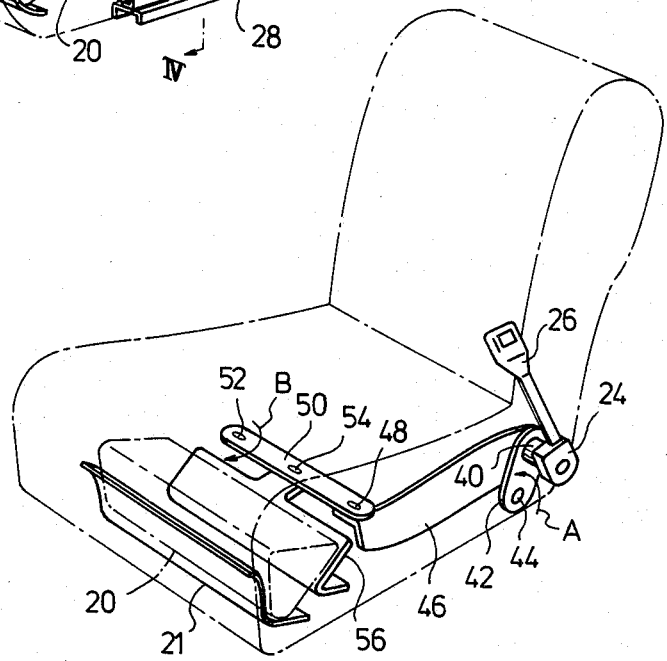
FIG. 5 is a perspective view of a second embodiment of the present invention.

Referring next to FIG. 5, there is shown a second embodiment of the seat according to the present invention. In this embodiment, a support shaft 40 which pivotally supports the anchor plate 24 is supported at one end of a pivoting plate 42, and the other end of the plate 42 is supported through a pin 44 to a strength retaining member such as the frame of the seat cushion 12 so that the plate 42 is able to pivot in the direction of the arrow A.

The pivoting plate 42 is pivotally supported at one end of a movable plate 46 on the side thereof which is closer to the rear end of the vehicle, the plate 46 extending in the longitudinal direction of the vehicle. One end of a pressing plate 50 is pivotally supported through a pin 48 at the other end of the movable plate 46. The other end of the pressing plate 50 is pivotally supported through a pin 52 by a strength retaining member of the seat cushion 12. Thus, the pressing plate 50 is able to pivot about the pin 52 (in the direction of the arrow B).

The central portion of a lateral plate 56 is pivotally supported through a pin 54 at the intermediate portion of the pressing plate 50. This lateral plate 56 opposes the cushion member 20 in a manner similar to that in the first embodiment.

According to this embodiment, therefore, when a relatively large load acts on the buckle device 26 at the time of an emergency situation of the vehicle, the plate 42 pivots about the pin 44 in the direction of the arrow A, thus causing the movable plate 46 to move toward the front end of the vehicle. In consequence, the pressing plate 50 pivots about the pin 52 in the direction of the arrow B, thereby pushing up the lateral plate 56, and thus pushing up the cushion member 20 toward the upper side of the seat cushion 12.

Accordingly, in this embodiment, the load which acts on the buckle device 26 can be employed as a force for pressing the cushion member 20 forwardly from the laterally central portion thereof.

In this embodiment also, a guide rail 33 which is similar to that in the first embodiment may be provided so as to guide the movable plate 46.

As has been described above, the seat according to the present invention is arranged such that a push-up member is buried in the front part of a seat cushion, while a movable member is provided in the seat cushion so that this member is movable toward the front end of the seat cushion, and a seatbelt anchor member is secured to the movable member. It is therefore possible to reliably restrain the body of an occupant in a safe condition when an emergency situation of the vehicle occurs.

What is claimed is:

1. A seat used in combination with a seatbelt system for a vehicle designed to protect an occupant in an emergency situation of the vehicle, so as to restrain the occupant's body, said seat comprising:
   (a) a push-up member buried in the front part of a seat cushion;
   (b) a movable member provided in said seat cushion such as to be movable toward the front end of said seat cushion, said movable member being adapted to push up said push-up member toward the upper side of said seat cushion when said movable member moves toward the front end of said seat cushion; and (c) a seatbelt anchor member secured at a part thereof to said movable member, whereby an increase in the seatbelt tension at the time of an emergency situation of the vehicle causes said anchor member to activate said movable member so as to push up said push-up member toward the upper side of said seat cushion, thereby limiting the movement of the occupant's waist toward the front end of the vehicle.

2. A seat according to claim 1, wherein said push-up member is made of an energy absorbing material having a higher resistance to compression than that of said seat cushion.

3. A seat according to claim 1, wherein the front end face of said movable member is slanted so as to face upwards, thereby enabling said push-up member to be readily pushed up.

4. A seat according to claim 1, wherein a pair of said movable members are respectively provided on two lateral sides of said seat cushion.

5. A seat according to claim 4, wherein the respective rear ends of said movable members are connected together.

6. A seat according to claim 4, wherein said anchor member is connected to the rear ends of said pair of movable members in such a manner as to transmit the webbing tension to said ends.

7. A seat according to claim 1, further comprising: a guide member for guiding said movable member.

8. A seat according to claim 7, wherein retaining means is provided between said guide member and said movable member, said retaining means allowing said movable member to move only when an emergency situation of the vehicle occurs.

9. A seat according to claim 8, wherein said retaining means is ruptured when the seatbelt tension which acts on said movable member exceeds a predetermined value.

10. A seat according to claim 1, wherein said movable member pivotally supports the intermediate portion of a lateral plate which contacts said push-up member, thereby applying force uniformly to said push-up member.

11. A waist restraining apparatus provided within a seat cushion of a seat mounted on a vehicle to limit the movement of the waist of an occupant when an emergency situation of the vehicle occurs, said apparatus comprising:

(a) a push-up member provided within said seat cushion;

(b) guide means provided within said seat cushion for guiding said push-up member in such a manner that said member is able to move upwards;

(c) a movable member movable toward the front end of the vehicle in response to the tension which acts on a webbing of a seatbelt system when an emergency situation of the vehicle occurs; and (d) a lateral member secured to said movable member to press said push-up member toward the front end of said seat cushion, whereby said push-up member sandwiched between said lateral member and said guide member is moved upwards by the action of said lateral member, thereby forming a protuberance at the front end portion of said seat cushion, and thus limiting the movement of the occupant's waist.

12. An apparatus according to claim 11, wherein the front end face of said lateral member is slanted so as to face upwards.

13. An apparatus according to claim 11, wherein a pair of said movable members are respectively provided on two lateral sides of said seat cushion.

14. An apparatus according to claim 11, further comprising a guide member for guiding said movable member.

15. An apparatus according to claim 14, wherein retaining mean is provided between said guide member and said movable member, said retaining means allowing said movable member to move only when an emergency situation of the vehicle occurs.

16. An apparatus according to claim 15, wherein said retaining means is ruptured when the seatbelt tension which acts on said movable member exceeds a predetermined value.

17. An apparatus according to claim 11, wherein a pair of said movable members are provided, and the respective rear ends of said movable members are connected together by a support shaft to which said seatbelt anchor is connected.

18. A waist restraining apparatus provided within a seat cushion of a seat mounted on a vehicle to limit the movement of the waist of an occupant when an emergency situation of the vehicle occurs, said apparatus comprising:

(a) a push-up member provided within said seat cushion;

(b) a lateral member disposed on the side of said push-up member which is closer to the rear end of the vehicle, said lateral member having a slanted front end face;

(c) pressing means pivotally supported at one end thereof by a frame of said seat and pivotally supporting at the intermediate portion thereof said lateral member; and (d) a movable member connected to the other end of said pressing means and subjected to the seatbelt tension when an emergency situation of the vehicle occurs, whereby, when an emergency situation of the vehicle occurs, said movable member uniformly presses said push-up member through said pressing member so that said push-up member is moved upwardly, thus forming a protuberance at the front portion of said seat.

19. An apparatus according to claim 18, wherein a guide panel for facilitating the upward movement of said push-up member is disposed at the front end of said push-up member.

* * * * *